(12) United States Patent
Schonberg et al.

(10) Patent No.: US 7,336,806 B2
(45) Date of Patent: Feb. 26, 2008

(54) IRIS-BASED BIOMETRIC IDENTIFICATION

(75) Inventors: Daniel Schonberg, Berkeley, CA (US); Darko Kirovski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 784 days.

(21) Appl. No.: 10/897,664

(22) Filed: Jul. 22, 2004

(65) Prior Publication Data

US 2005/0207614 A1 Sep. 22, 2005

Related U.S. Application Data

(60) Provisional application No. 60/555,555, filed on Mar. 22, 2004.

(51) Int. Cl.
*G06K 9/00* (2006.01)

(52) U.S. Cl. .................. 382/117; 382/298; 382/232

(58) Field of Classification Search ............... 382/117, 382/298, 232
See application file for complete search history.

(56) References Cited

U.S. PATENT DOCUMENTS

| | | | |
|---|---|---|---|
| 4,386,233 A | 5/1983 | Smid et al. | |
| 4,424,414 A | 1/1984 | Hellman et al. | |
| 4,567,600 A | 1/1986 | Massey et al. | |
| 4,633,036 A | 12/1986 | Hellman et al. | |
| 4,820,912 A | 4/1989 | Samyn | |
| 4,881,264 A | 11/1989 | Merkle | |
| 4,956,863 A | 9/1990 | Goss | |
| 5,003,597 A | 3/1991 | Merkle | |
| 5,016,274 A | 5/1991 | Micali et al. | |
| 5,299,262 A | 3/1994 | Brickell et al. | |
| 5,337,361 A | 8/1994 | Wang et al. | |
| 5,384,846 A | 1/1995 | Berson et al. | |
| 5,388,158 A | 2/1995 | Berson | |
| 5,420,924 A | 5/1995 | Berson et al. | |
| 5,469,506 A | 11/1995 | Berson et al. | |

(Continued)

FOREIGN PATENT DOCUMENTS

DE 10204870 8/2003

(Continued)

OTHER PUBLICATIONS

Rey et al.; "A Survey of Watermarking Algorithms for Image Authentication" EURASIP Journal on Applied Signal Processing, vol. 2002 No. 6, Jun. 2002, pp. 613-621.

(Continued)

*Primary Examiner*—Matthew C. Bella
*Assistant Examiner*—Mike Rahmjoo
(74) *Attorney, Agent, or Firm*—Lee & Hayes, PLLC

(57) ABSTRACT

A method includes forming a feature vector associated with an iris of an individual using a transform operation including converting an iris image into a log-polar image, scaling one or more samples in the log-polar image according to a Fourier-Mellin transform, and performing a Fourier transform on the scaled samples. The method involves forming an iris digest based on the feature vector, and creating a biometric identifier based on the iris digest. A system includes an iris scanner, an iris analyzer that forms an image of a human iris wherein the presence of eyelashes in the image is minimized, forms a feature vector associated with the iris image using a modified Fourier-Mellin transform, and compresses the feature vector into an iris digest.

23 Claims, 10 Drawing Sheets

U.S. PATENT DOCUMENTS

| | | | |
|---|---|---|---|
| 5,864,622 A | 1/1999 | Marcus | |
| 5,974,150 A | 10/1999 | Kaish et al. | |
| 6,035,914 A | 3/2000 | Ramsey et al. | |
| 6,193,156 B1 | 2/2001 | Han et al. | |
| 6,536,665 B1 | 3/2003 | Ray et al. | |
| 7,010,167 B1 | 3/2006 | Ordowski et al. | |
| 7,089,420 B1 | 8/2006 | Durst et al. | |
| 7,152,047 B1 | 12/2006 | Nagel | |
| 2004/0005083 A1* | 1/2004 | Fujimura et al. | 382/103 |
| 2004/0057581 A1* | 3/2004 | Rhoads | 380/59 |
| 2004/0114781 A1* | 6/2004 | Cho | 382/117 |
| 2005/0008201 A1* | 1/2005 | Lee et al. | 382/117 |
| 2005/0131900 A1 | 6/2005 | Palliyll et al. | |

FOREIGN PATENT DOCUMENTS

| | | |
|---|---|---|
| EP | 0889448 | 1/1999 |
| EP | 1173001 | 1/2002 |
| WO | WO9119614 | 12/1991 |
| WO | WO9917486 | 4/1999 |
| WO | WO0143086 | 6/2001 |

OTHER PUBLICATIONS

Min-Hui, et al.; "An Image Self-Verification Scheme Based on Rehash Technique" 2003 International Conference on Communication Technology, vol. 2, Apr. 2003, pp.1883-1886.

Chang, et al.; "Robust Image Authentication Using Content Based Compression" Multimedia Systems, vol. 9 No. 2, Aug. 2003.

"Certificate Authority Technology" SC Infosecurity News Magezine, Feb. 1999, pp. 42-43.

"Using Biometrics for Border Security" General Accounting Office (GAO document 03-174) Nov. 2002, 242 pages.

"Counterfeit Deterrent Features for the Next-Generation Currency Design", Naitonal Materials Advisory Board (NMAB), 4-Description and Assessment of Deterrent Features, pp. 39-86.

"Counterfeit Deterrent Features for the Next-Generation Currency Design (1993)", National Materials Advisory Board (NMAB); Appendix E: Methods for Authentication of Unique Random Patt . . . pp. 117-120.

Pappu, R., "Physical One-Way Functions", www.sciencemag.org, Vo. 297, Sep. 20, 2002, pp. 2026-2030.

Rivest, R.L., et al., "A Method for Obtaining Digital Signatures and Public-Key Cryptosystems", 15 pages.

Rivest, R., "The MD5 Message-Digest Algorithm", MIT Laboratory for Computer Science and RSA Data Security, Inc., Apr. 1992, 18 Pages, http:/www.faqs.org/rfcs/rfc1321.html.

Brzakovic et al, "Document Recognition/Authentication Based on Medium-Embedded Random Patterns", Proceedings of the Second International Conference on Tsukuba Science City, Japan, Oct. 20-22, 1993, pp. 95-98.

Pennebaker et al, "An Overview of the Basic Principles of the Q-Coder Adaptive Binary Arithmetic Coder", IBM Journal of Research and Development, vol. 32, No. 11, Nov. 1988, pp. 717-726.

Simmons, "Identification of Data, Devices, Documents and Individuals", Proceedings of the Annual International Camahan Conference on Security Technology, Taipei, Oct. 1-3, 1991, p. 208.

* cited by examiner

IRIS-BASED BIOMETRIC IDENTIFICATION

CROSS-REFERENCE TO RELATED APPLICATIONS

This patent application claims priority from U.S. Provisional Patent Application Ser. No. 60/555,555, filed on Mar. 22, 2004, and entitled "Cryptographically-Secure Biometric Person Identification," which is incorporated herein by reference for all that it discloses.

BACKGROUND

In the field of information technology, the term "biometric system" typically refers to an automated system that uses measurable physiological features or behavioral characteristics of an individual to either determine or verify the identity of the individual. Physiological biometric features that are commonly used in biometric systems include fingerprints, the face, and various features of the eye. Behavioral biometrics characteristics that are commonly used in biometric systems include voice, keystrokes, and signatures. Hereinafter, only systems that use physiological features will be discussed.

In general, biometric identification involves first capturing a sample of a physiological feature from an individual. Capturing typically involves some form of optical scanning of the physiological feature. Next, distinctive characteristics are identified in the captured sample and a mathematical representation of the distinctive features (an enrollment template) is generated. The enrollment template is then stored for later comparison.

When the identity of an individual is being determined or verified, a sample of the physiological feature is again captured from the individual. The distinctive characteristics of the captured sample are identified and a "verification template" is generated. The verification template is then compared to one or more enrollment templates stored in a database.

In the case of identity determination, the verification template is compared to a number of previously stored templates. This process is commonly referred to as a one-to-many comparison. For each template comparison, a score is determined that indicates how well the verification template matches the enrollment template. The enrollment template with the maximum score is designated as matching the verification template, and the identity of the individual will be identified as the individual associated with the enrollment template.

In the case of identity verification, the verification template is compared to the individual's previously stored enrollment template. This process is commonly referred to as a one-to-one comparison. A score is then determined that indicates how well the verification template matches the enrollment template. If the score of a comparison exceeds a given match threshold, a match will be determined to have been made and the identity of the individual will be indicated as verified. Hereinafter, only identity verification will be discussed.

In creating a biometric identity verification system there are a number of trade-offs that must be considered. For example, a trade-off is typically made between the precision and/or security of a system versus the cost of the system. For example, a system designer may choose a high-performance computing device, a large database capable of storing many templates, advanced scanning devices, a number of scanning devices at a number of different access points, and/or a highly secure network to interconnect each of these elements. While these elements may enhance the precision and/or security of the biometric identity verification system, they will also greatly increase the systems cost. Conversely, if a system designer chooses to select lower performance and/or lower precision elements, the precision and/or security of a system will be reduced.

Another trade-off is typically made between the number of false negatives that a system will generate and the number of false positives a system will generate. In general, a false positive occurs when a verification template and an enrollment template are determined to match when, in fact, the individual from whom the verification template was generated is not the same individual from whom the enrollment template was generated. In contrast, a false negative occurs when a verification template and an enrollment template are determined not to match, when in fact the verification and enrollment templates were generated from the same individual.

Typically, false positives can be reduced by generating extremely detailed verification and enrollment templates and by setting the match threshold high. Unfortunately, a system that creates very detailed templates will typically be more expensive and/or computationally complex than a system that creates less detailed templates. Additionally, a system that uses a very high match threshold will typically generate more false negatives. Conversely, a system that uses a low match threshold will typically generate more false positives.

With the foregoing in mind, there is a need in the art for an inexpensive biometric identity verification system that provides, among other things, low rates of false positives and/or false negatives.

DETAILED DESCRIPTION

Described herein are various implementations of systems and methods for creating and verifying individuals and/or documents using data derived from a captured sample of a human iris. In accordance with various implementations described herein, a secure document includes, among other things, a graphical representation of a digitally signed original iris digest (e.g, template) obtained from a scan of an individual's iris. When verification of the document is desired, the graphical representation is acquired from the document and an attempt is made to verify the digital signature. If the digital signature is verified, the individual's iris is scanned and a verification iris digest (e.g., template) is created. The verification iris digest is then compared to the original iris digest acquired from the document. If the verification iris digest and the original iris digest match, the document is verified.

As described herein, the original iris digest may be created using unique iris isolation and compression processes. In one implementation, compressed features are at maximal distance with respect to a reference iris image database. The iris analysis algorithm performs three main phases: (i) a detecting phase detects the human iris by using a model which is able to compensate for the noise introduced by the surrounding eyelashes and eyelids, (ii) a converting phase converts the isolated iris using a modified Fourier-Mellin transform into a standard domain where the common patterns of the human iris are concisely represented, and (iii) a compressing phase optimally selects, aligns, and near-optimally compresses selected transform coefficients for each individual user. Additionally, the compressed iris data may be encoded in a bar code with text.

Figure 1:
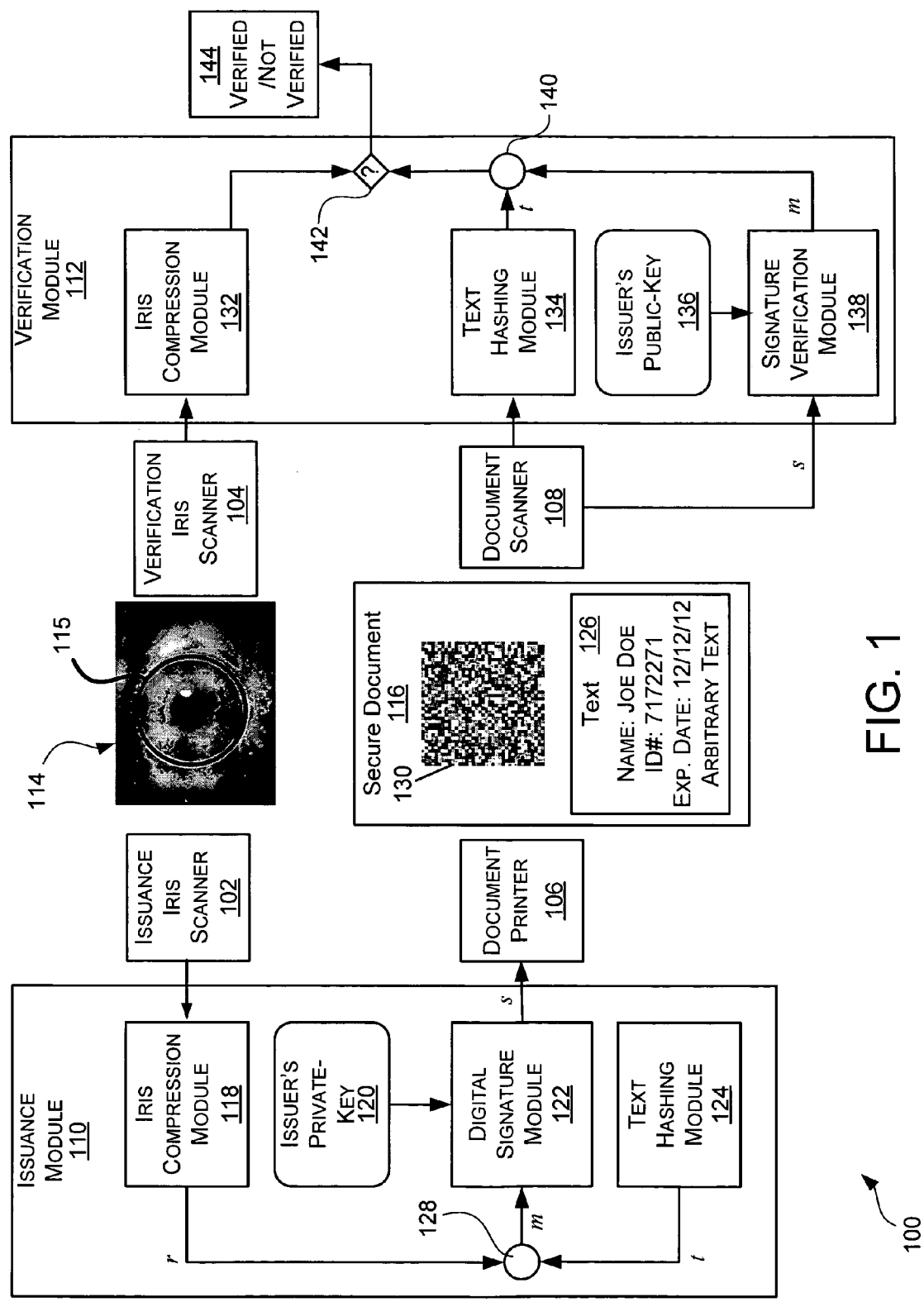
FIG. 1 illustrates an exemplary iris-based biometric verification system.

FIG. 1 illustrates one implementation of an iris-based biometric verification system 100. Included in the system 100 are an iris issuance scanner 102 for acquiring an image of an eye 114, an issuance module 110 for processing the image of the eye 114 and producing a compressed encrypted representation of the iris of the eye, and a document printer 106 for printing the compressed encrypted representation of the iris on a secure document 116. Also included in the system 100 are a verification scanner 104 for acquiring an image of the eye 114, document scanner 108 for acquiring an image of the secure document 116, and a verification module 110 for processing the image of the eye 114 and the image of the document to verify the document and/or individual.

Generally, the issuance iris scanners 102 and 104 may comprise any of a number of optical scanners that are operable to capture an image of an individual's eye. For example, and without limitation, in one implementation, both scanners 102 and 104 are passive iris scanners, which produce a digital representation of an eye.

Generally, the document printer may comprise any of a number of printing devices that are operable to print the secure document 116. The document scanner 108 may comprise any of a number of optical scanners that are operable to capture information printed on the secure document 116.

As shown, the issuance module 110 includes an iris compression module 118, a digital signature module 122, a text hashing module 124, and a combining module 128, and an issuer's private key 120. The verification module 112 includes an iris compression module 132, a test hashing module 134, a signature verification module 138, a comparing module 142, and an issuer's public key 136.

It should be understood that the term module is used in a general sense to describe a component that is operable to perform one or more designated functions. A module may be implemented in various ways and forms. For example, a module may be implemented in or as hardware, software, firmware, or in various combinations of hardware, software, and/or firmware, depending on such factors as speed, cost, size, etc. For example, and without limitation, in one implementation each of the modules in the system 100 comprises software that is stored on a computer-readable medium and executed on a computing system, such as the computing system described below with respect to FIG. 10. With the following in mind, each module of the system 100 will now be generally described with respect to its designated function or functions within the system 100.

In general, the iris, compression module 118 is operable to receive an image of an individual's eye 114 from the issuance iris scanner 102 and process the image to form an iris digest, r, representing the iris 115 of the eye 114. The iris compression module 118 emphasizes distinguishing features of the iris that distinguish the iris 115 from a reference database of iris digests. Thus, the iris compression is based primarily on pattern recognition, with perceptual quality being secondary.

Generally, the iris compression module 118 performs four steps in forming the iris digest. First, the iris 115 is isolated from the other portions of the scanned eye 114. Isolating the iris includes separating the iris from the surrounding cornea, pupil, eyelids, eyelashes, skin, and so on. After the iris is isolated, the scanned iris data is transformed into a standard form used during verification. The core features of the iris are then extracted so as to maximize a distance objective. The extracted features are then compressed. Each of the steps performed by the iris compression module 118 is described in further detail below.

In a particular implementation of the system 100, supplemental text 126 is combined with the iris digest. The text 126 may include the individual's personal information, and may also include an expiration date, and any other data that may facilitate verification. The text hashing module 124 performs a hash function on text 126 to create a cryptographically secure version of the text 126. The hash function produces a message digest, t, of fixed length that represents the text 126. Exemplary hash functions that may be used by the text hashing module 124 include, among others, the Secure Hash Algorithm (SHA1) developed by the National Institute of Standards and Technology (NIST and the National Security Agency (NSA) and the MD5 algorithm developed by Professor Ronald L. Rivest of the Massachusetts Institute of Technology (MIT).

The combining module 128 combines the message digest from the text hashing module 124 with the iris digest from the iris compression module 118. A particular implementation of the combining module 128 concatenates the iris digest with the message digest. The output of the combining module 128 is combined message m.

The digital signature module 122 signs the combined message m with an issuer's private key 120. One example of an issuer's private key 120 is an RSA private key from the well-known RSA public key infrastructure (PKI). The digital signature module 122 generates a signed message, s, based on the combined message, m. An implementation of the digital signature module 122 encodes the signed message in barcode 130.

The document printer 106 prints the barcode 130 and the text 126 on the secure document 116. Thus, the combined, signed iris digest and hashed text are compactly encoded onto the security document 116, with which the user can be verified.

After the secure document 116 is issued, the individual can be verified by the verification module 112. The scanner 104 at the verification module 112 scans the individual's eye 114 to capture at least a portion of the individual's iris 115.

The iris compression module 132 generates a feature vector from the scanned eye information. The iris compression module 132 generates the feature vector by performing operations similar to those of the iris compression module 118, except that the feature vector does not need to be digitized for storage.

The text hashing module 134 performs a hashing function on the text 126 in the same way that text hashing module 124 of the issuance module 110 hashed the text 126. Accordingly, the output of the text hashing module 134 is message digest t.

The signature verification module 138 verifies validity of the encoded barcode 130 using the issuer's public-key 136. The signature verification module 138 converts scanned barcode data into an authentication signature. The signature verification module 138 obtains the issuer's public-key 136 and performs RSA signature authentication to obtain the signed message, m.

The separating module 140 separates the message digest, t, from the signed message, m, and recovers the original feature vector from the bits in the barcode. The output of the separating module 140 includes information that indicates which transform coefficients were used at issuance to generate the feature vector. The iris compression module 132 can use the coefficient information from the separating module 140 to extract the corresponding transform coefficients to create the feature vector for comparison.

The comparing module 142 compares the feature vector from the iris compression module 132 with the feature vector that was recovered from the bar code. Based on the output of the comparing module 142, a verification indicator 144 indicates whether the iris 115 corresponds to the secure document 116, thereby verifying the identity of the individual.

Exemplary Operations

Figure 2:
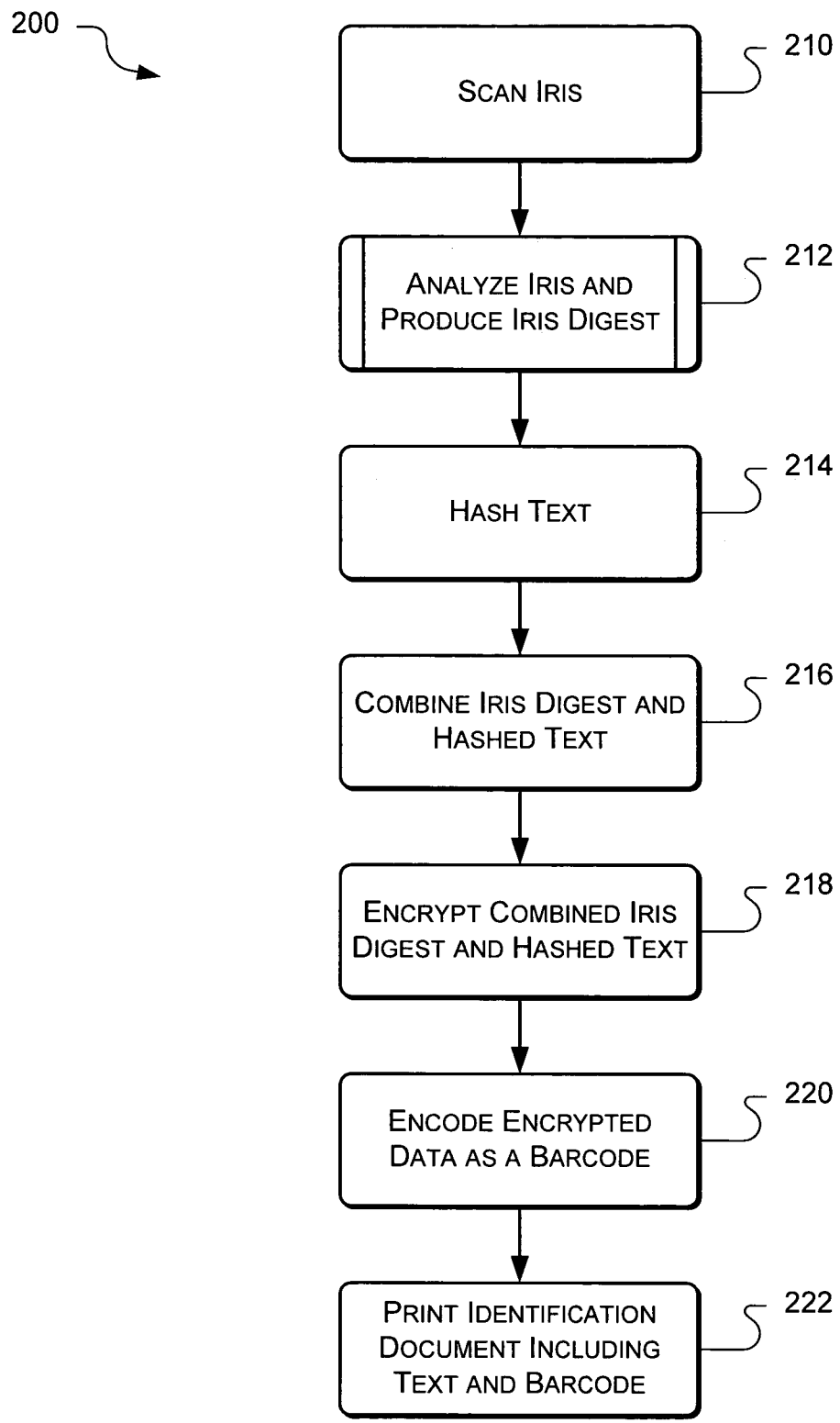
FIG. 2 is a flowchart illustrating an iris-based biometric verification algorithm for issuing an iris-based security document.

FIG. 2 illustrates an iris-based biometric verification algorithm 200 that can be carried out by the iris-based biometric verification system 100 shown in FIG. 1. The verification algorithm 200 may likewise be carried out by systems other than the iris-based biometric verification system 100. The iris-based biometric verification algorithm 200 includes exemplary operations for issuing an iris-based security document for use in verifying the individual using the individual's iris and the security document.

A scanning operation 210 first scans an individual's iris. One implementation of the scanning operation 210 employs the BM-ET100US Authenticam Iris Recognition Camera from PANASONIC, which is a relatively inexpensive (e.g., US $100), off-the-shelf iris-scanning camera. Any other iris scanner can be used in the scanning operation 210, depending on the particular implementation. The scanning operation 210 digitizes an image of the individual's iris and stores the image in memory where it can be analyzed.

An analyzing operation 212 analyzes the iris and produces an iris digest. One implementation of the analyzing operation 212 includes steps of iris detection (i.e., isolation), transformation, feature extraction, and data compression. A detailed description of the steps performed in the analyzing operation 212 is provided below with respect to FIGS. 3-5.

A hashing operation 214 performs a hashing operation on supplemental text. The hashing operation 214 generates a message digest. A particular implementation of the hashing operation 214 executes a hashing algorithm, such as SHA1 or MD5, over the supplemental text to create a fixed length message digest.

A combining operation 216 combines the iris digest with the message digest. An exemplary implementation of the combining operation 216 concatenates the iris digest with the message digest.

An encrypting operation 218 encrypts the combined iris digest and message digest. In a particular implementation of the encrypting operation 218, the combined iris digest and message digest are signed with a private key for use in a public key infrastructure (PKI).

An encoding operation 220 encodes the encrypted data as a barcode. In a particular implementation, the barcode is a 2D color representation of the encrypted data. The barcode is preferably readable by a standard barcode scanner.

A printing operation 222 prints an identification document including the supplemental text and the barcode. The printing operation 222 may also print a picture of the individual on the identification document. The printing operation 222 can be performed, by a standard computer printer that prints in color or gray scale.

Figure 3:
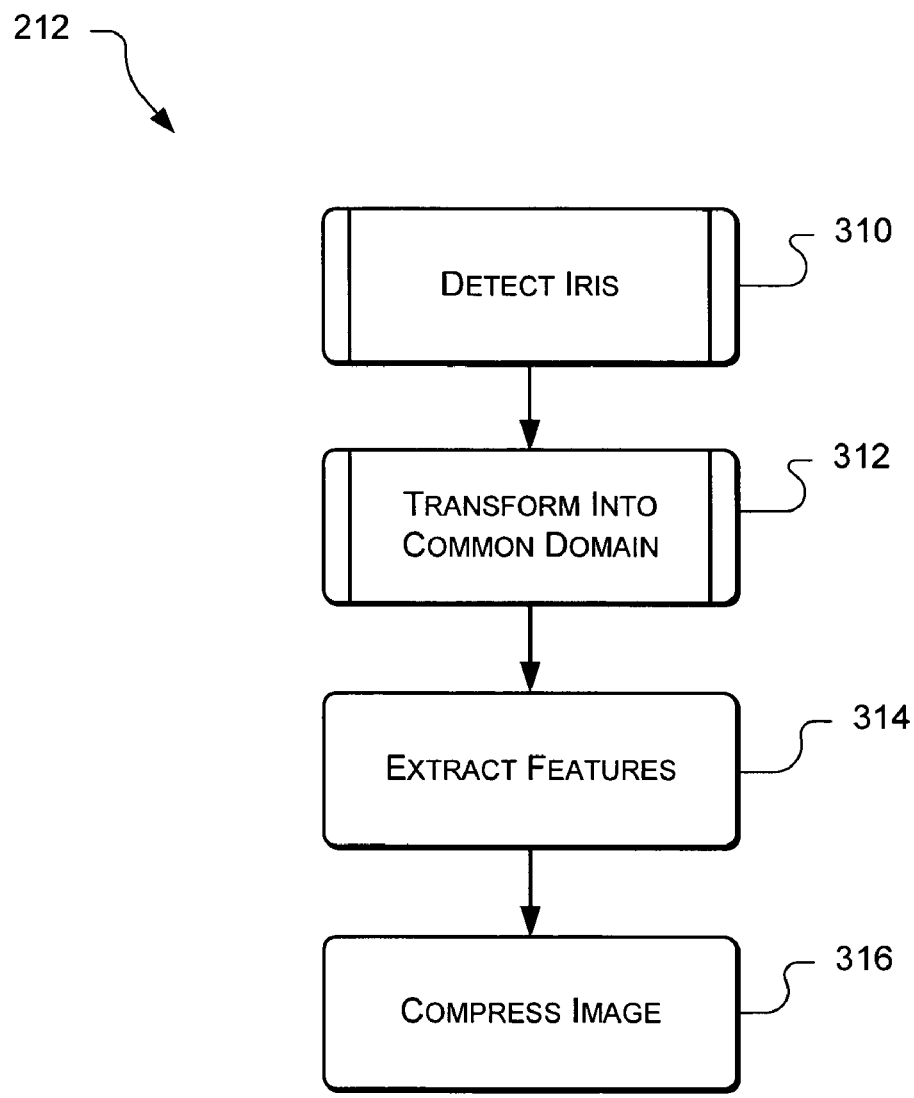
FIG. 3 is a flowchart illustrating an iris analysis algorithm.

FIG. 3 illustrates an exemplary iris analysis algorithm 212. The iris analysis algorithm 300 takes as input a scanned eye image and outputs a compressed image representing the iris of the eye.

Figure 4:
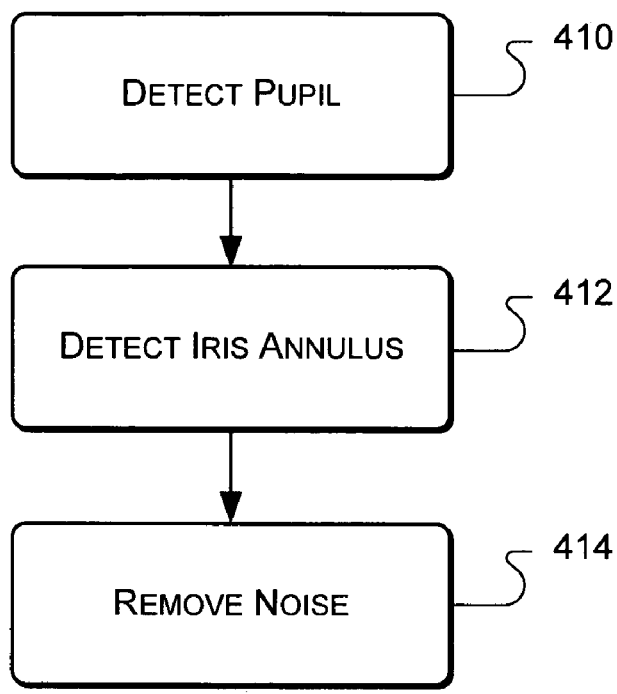
FIG. 4 is a flowchart illustrating an iris detection algorithm.

A detecting operation 310 detects the iris within the scanned eye. In the detecting operation 310, the iris is isolated from other portions of the eye using a number of techniques. A specific implementation of the detecting operation 310 is illustrated in FIG. 4, which is discussed in detail below. The output of the detecting operation 310 is an isolated iris image.

A transforming operation 312 transforms the isolated iris image into a common domain that facilitates efficient verification. The transforming operation 312 employs several operations, examples of which are discussed in detail with respect to FIG. 5. The output of the transforming operation 312 is a standardized image.

An extracting operation 314 extracts from the standardized image selected features, in the form of a feature vector, in accordance with a distance metric. The feature vector captures features of the scanned iris that distinguish the scanned iris from a set of other stored iris images. For ease of explanation, particular details of an exemplary extracting operation 314 are discussed below following the discussions of FIG. 4 and FIG. 5.

A compressing operation 316 generates a compressed representation of the extracted feature vector. Again, for ease of explanation, particular details of an exemplary compressing operation 316, are discussed below following the discussions of FIG. 4 and FIG. 5.

Referring now to FIG. 4, therein is illustrated an exemplary iris detection algorithm 310, which is discussed here. The iris detection algorithm 310 receives an input image, I[n,m], of an eye and separates the iris from the surrounding noise, resulting in the output image R[n, m]. Such noise includes, but is not limited to, the pupil, the cornea, the eyelids, the eyelashes, the eyebrows, and the surrounding skin. Iris detection performed by the iris compression module considers the foregoing potential noise sources and mitigates their effects. The iris compression module retains as much of the iris as possible while also making certain to take in as little noise as possible.

Figure 6:
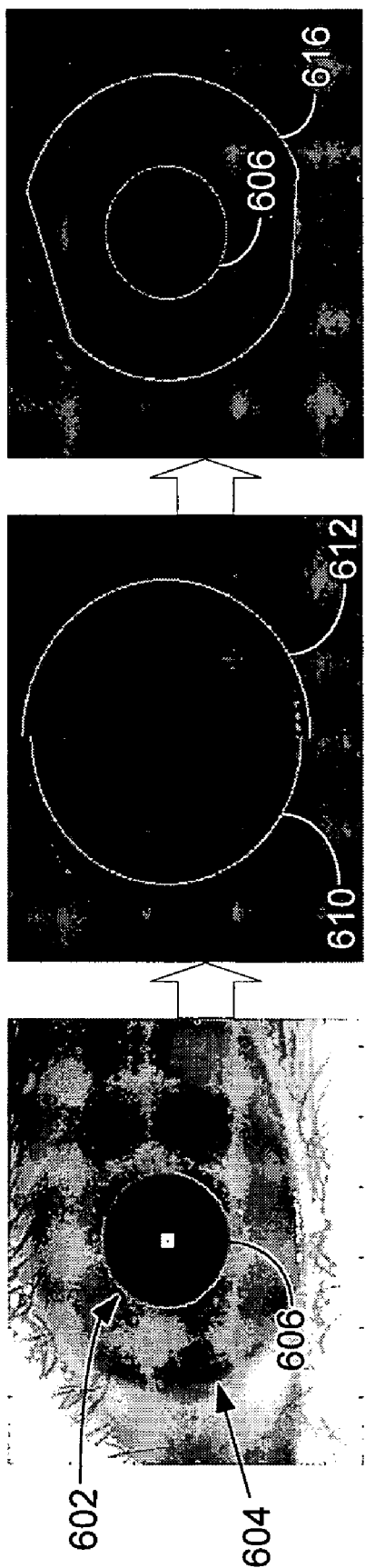
FIG. 6 illustrates three exemplary phases that can be used in iris detection in an exemplary iris-based biometric verification process.

Isolating relevant iris data is important for system performance as the noise factors can affect the compression and pattern recognition processes, in particular in the presence of a limited storage space. The exemplary iris detection algorithm includes three operations: (i) a pupil detection operation 410, (ii) outer iris annulus detection operation 412, and (iii) a noise removal operation 414. Each successive operation further refines the image, removing noise. In the end, the result is an image, R[n,m], whose size equals that of the input image, I[n,m], but where the pixels for non-iris regions have been masked. The operations of FIG. 4 are discussed with reference to FIG. 6, which graphically illustrates the iris detection process.

In the pupil detection operation 410, the pupil and the iris center are located. The pupil 602 (FIG. 6) is the large dark area in the center of the iris 604. The scanned pupil 602 typically is roughly circular in shape and has low pixel intensities.

Accordingly, an implementation of the pupil detection operation 410 locates a 5 by 5 region with the lowest mean pixel value. This region is highly likely to be located in the pupil. This implementation of the pupil detection operation 410 is typically iterative, because eye-lashes or other image artifacts can result in incorrect pupil detection. Thus, multiple iterations can significantly reduce the likelihood of incorrect pupil detection. The following equation is used to identify the 5 by 5 region:

$$\{n_0, m_0\} = \operatorname*{argmin}_{n,m} I[n, m] \otimes M[n, m], \quad (1)$$

$$M[n, m] = \begin{cases} 1 & \text{if } |n| \leq 2, |m| \leq 2 \\ 0 & \text{if otherwise} \end{cases}$$

In equation (1), operator indicates linear convolution. Equation (1) is a moving average filter, allowing a simple search to result in the minimum and can be implemented efficiently using available image processing techniques. After the 5 by 5 region is found, an inner loop iterative process is performed.

First, the mean and variance of I[n, m] are determined for the pixels in the 5 by 5 region as follows:

$$\mu = \frac{\sum_{n,m} I[n, m] M[n_0, m_0]}{\sum_{n,m} M[n_0, m_0]} \quad (2)$$

$$\sigma^2 = \frac{\sum_{n,m} I[n, m]^2 M[n_0, m_0]}{\sum_{n,m} M[n_0, m_0] - 1} - \frac{\left(\sum_{n,m} I[n, m] M[n_0, m_0]\right)^2}{\left(\sum_{n,m} M[n_0, m_0] - 1\right)\left(\sum_{n,m} M[n_0, m_0]\right)}$$

Second, for each pixel location $(n_1, m_1)$ adjacent to the non-zero region of M[n, m] such that it is within a tolerance, rt, of the mean and variance, $M[n_1, m_1]$ is set equal to 1.

$$\frac{|I[n_1, m_1] - \mu|}{\sigma} < rt \quad (3)$$

This process is repeated iteratively until the region growth decreases to a specified level (which can be set as low as zero). Once the region is found, the border B[n, m] of M[n, m] is defined as the pixel locations on the outer edge of the non-zero region of M[n, m]. If the standard deviation of the diameter of this region is less than a specified threshold, the region is determined to be located within the pupil 602.

If the standard deviation is too large (i.e., outside the specified threshold), then it is likely that the region found is not in fact the pupil 602. If this occurs, the outer loop is iterated but the previously located false region is ignored in subsequent iterations. To find the pupil's 602 center, denoted $(n_c, m_c)$, the indices of the pupil border 606 are averaged. Such averaging works well since the border 606 is roughly circular and the averaging can be implemented with low complexity.

After the pupil 602 is detected, the iris annulus detection operation 412 uses the pupil border 606 to detect an outer annulus around the iris 604. The detection operation 412 estimates an ellipse around the iris 604. Estimating an ellipse allows for correction of errors due to flash reflection or other sorts of pixel variation. In addition, the outer edge of the iris 604 is assumed to have the same arc as the pupil border 606. This is reasonable since the iris 604 is a roughly annular region.

The iris annulus detection operation 412 initially performs edge detection on the image with a Canny edge detector. The outer edge of the iris 604 is found by correlating arcs of various radii with the output of the edge detector. Denoting the output of the edge detector as E[n, m], the results can be written as follows:

$$\{\hat{R}, A\} = \operatorname*{argmax}_{R} C\left(E[n, m], \frac{(n - n_c)^2}{1^2} + \frac{(m - m_c)^2}{A^2} = R^2\right), \quad (4)$$

where $C(I_x, I_y)$ denotes normalized correlation of $I_x$ and $I_y$, $\hat{R}$ represents the outer radius, and A represents the inner radius of the iris 604. The maximization in equation (4) is with respect to R. Values $n_c$, $m_c$, and A are fixed, based upon the pupil. The value A represents the difference in pixilization between horizontal and vertical. The value A is estimated prior to the maximization based upon the edge of the detected pupil. Preferably, A is set equal to 1; however, A in general can vary depending on the particular size and position of a particular pupil being analyzed.

In a particular implementation, a search for $\{\hat{R}, A\}$ is performed by calculating equation (4) at several radii and choosing the value of R that maximizes equation (4). This procedure is repeated twice: once for the left half of the image and once for the right half of the image. Repeating the procedure twice is done to allow for slight errors in the camera angle, other possible picture imperfections, and in general, iris asymmetry. In addition, a penalty term is applied to ensure that the left and right outer radii are substantially equal within a specified tolerance. Application of equation (4) identifies an arc 610 on the left edge of the iris 604 and an arc 612 on the right edge of the iris 604. Thus, the pupil detection operation 410 and the iris detection operation 412 obtain inner and outer radii of the iris 604.

The noise removal operation 414 removes noisy elements around the left arc 410 and right arc 412. Certain noise elements can be easily removed such as skin or eyelid contact using techniques discussed below. However, the noise due to eyelashes, which frequently has strong components radial with respect to $(n_c, m_c)$, has a significantly stronger effect on iris analysis as it correlates with many iris patterns.

Eliminating eyelash noise is important to effective iris compression for subsequent pattern matching. One method to avoid the eyelash problem is to insist that system users fully open their eyelids in order for the verifier to take a full scan of users' irises; an action that carries certain inconvenience for the average user and is thus not recommended for use in practice.

The noise removal operation 414 also applies a smoothness metric, which is applied across the left arc 610 and right arc 612. Application of the metric identifies strong changes in the mean and variance of the inner and outer regions of E[n, m]. It has been found empirically that such changes are correlated to the overlap of eyelashes and eyelids upon iris patterns.

E[r, θ] is denoted as a transformation of E[n, m] into polar coordinates. At an angle $\theta_0$, the outer radius of E[r, θ] is equal to $r_0 = \hat{R}(\cos^2 \theta_0 + \hat{A}^{-2} \sin^2 \theta_0)^{-1/2}$. If 'Â' is equal to 1, the foregoing function defines a true circle when $\theta_0$ is varied from 0° to 360°. However, due to pixilization of the imaging process, the value of 'Â' is typically not equal to 1.

The smoothness metric is defined as follows:

$$\int_{\theta_0-\Delta}^{\theta_0+\Delta} \left( \int_{r_0-\delta}^{r_0+\delta} E(r, \theta) dr - \int_{r_0-\delta}^{r_0+\varepsilon} E(r, \theta) dr - \int_{r_0-\varepsilon}^{r_0+\delta} E(r, \theta) dr \right) d\theta$$

The result of the above integral is a function of $\theta_0$. Low points in the above function indicate noise. Thus, the resulting function is searched for a large plateau near the center. In a particular implementation of the noise removal operation 414, the values Δ, δ, and ε are set by the user, but often these values are relative to a particular imaging quality. In a particular usage scenario, the values are chosen as $\delta = 0.03 \cdot r_0$, $\varepsilon = 2.5 \cdot \delta$, and $\Delta = 2°$. By searching for the largest region above a specified threshold, it is possible to determine where the eye features acting as noise begin to impede upon the iris. The largest "consistent" region of the above integral corresponds to the smoothest part of the outer ellipse of the iris.

In order to simplify processing, and avoid problems due to eyelash and related noise, the tops and bottoms of the left arc 610 and right arc 612 are connected to define the border 616 of the iris region. This eliminates noise from the iris 604 and ensures that a pure region of the iris 604 is isolated. Connecting the arcs can result in some amount of iris data loss. Typically, the removed iris data is only recoverable at the cost of a great deal of computational complexity. If the amount of iris data that loss is small, the lost iris data is simply ignored. If the amount of iris data loss is non-trivial, it may be necessary to perform another iris scan.

Figure 7:
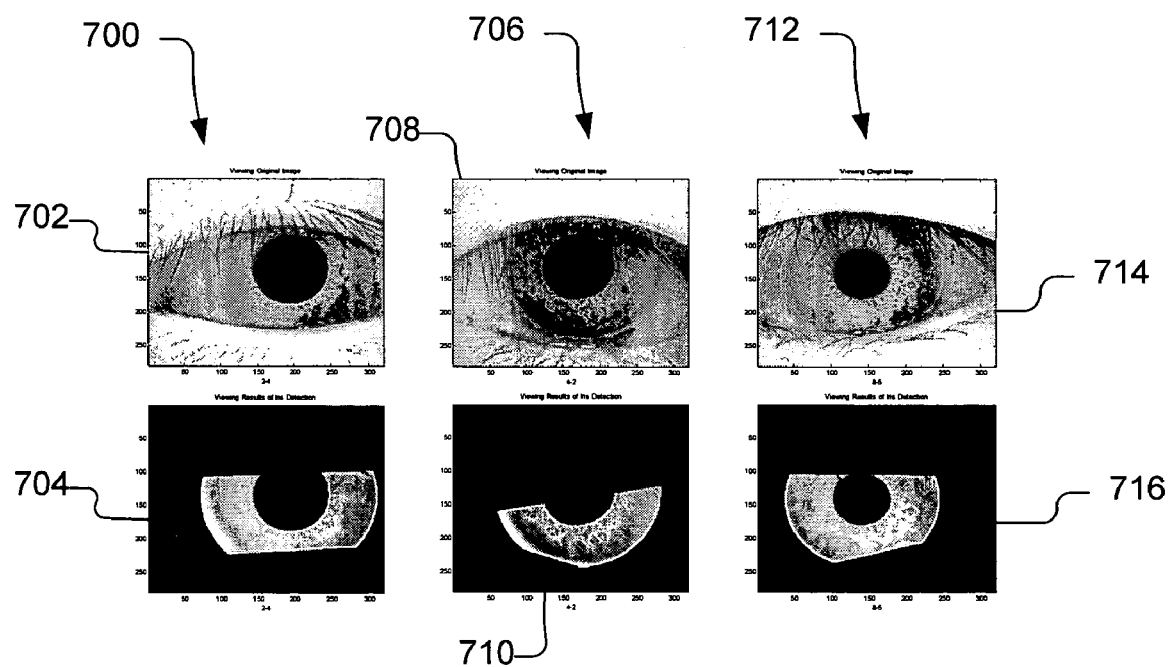
FIG. 7 illustrates three exemplary pairs of iris images before and after the noise removal phase in an exemplary iris-based biometric verification process.

FIG. 7 illustrates three exemplary pairs of iris images before and after the iris detection algorithm 310. The image pairs illustrate how eyelash noise and other noise can effect the noise removal operation 414. In a first image pair 700, after noise due to eyelashes and eyelids is removed from input image I[n,m] 702, a relatively large portion of the iris remains in image R[n,m] 704.

In a second image pair 706, the eyelashes hang substantially farther down over the pupil and the iris in input image I[n,m] 708. As a result, the portion of iris remaining after noise removal phase 714 is only about half in the associated output image R[n,m] 710. The third image pair 712 illustrates yet another result in which a relatively large portion of the iris from input image I[n,m] 714 is obtained in output image R[n,m] 716 after pupil detection, iris annulus detection, and noise removal.

Figure 5:
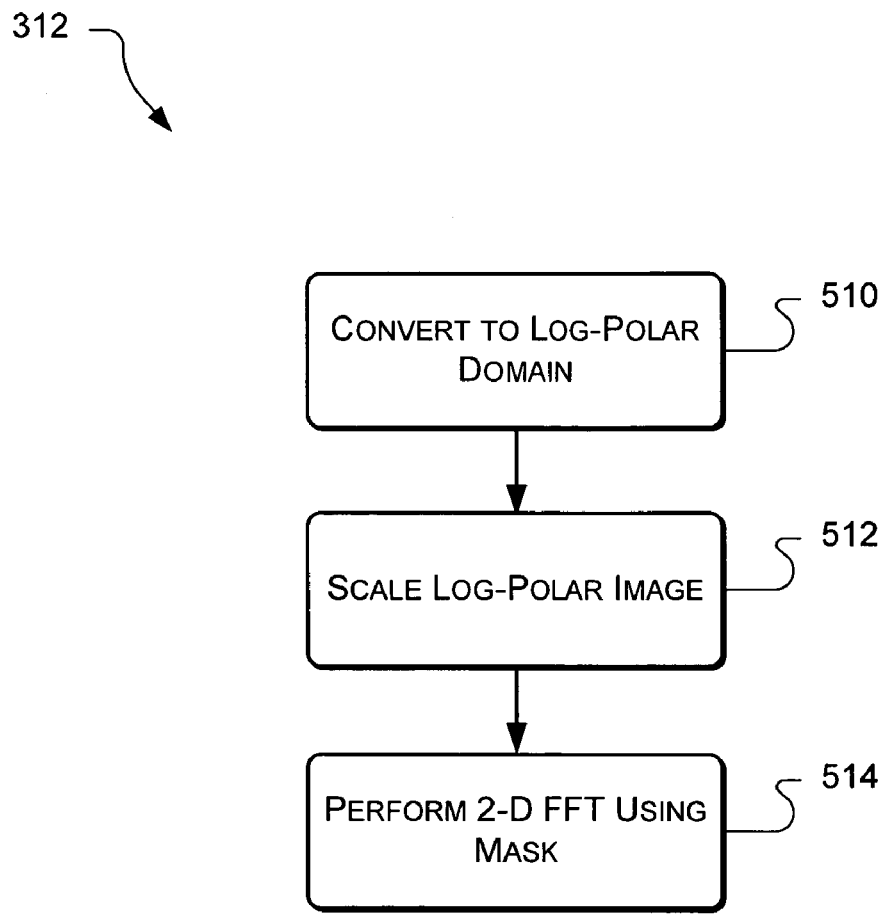
FIG. 5 is a flowchart illustrating an iris image transformation algorithm.

Referring now to FIG. 5, shown therein is an exemplary iris image transformation algorithm 312. Because the iris width can vary due to dilation and camera positioning, and the location of the iris can vary within the image, it is useful to transform the annular shape of the iris into a rectangular shape. Further, the dilation of the pupil and associated effects on the iris suggests the use of a scale invariant transform. Such a transform can substantially eliminate the effects of pupil dilation and illumination.

The exemplary transformation algorithm 312 shown in FIG. 5 employs a modified Fourier Mellin transform (mFMT). The mFMT includes three general operations: converting to log-polar domain, scaling radially according to the FMT, and performing a Fast Fourier transform (FFT). Certain attributes of the mFMT make the transform particularly useful in iris-based biometric verification.

For example, the FMT is scale invariant, meaning that the FMT of s(t) and the FMT of s(at) are related by a phase shift. In addition to the FMT's scale invariance, the FMT and the Fourier transform are related to each other in a way that is particularly useful with respect to iris verification, due to the nature of most irises.

In addition, most iris features occur along ridges that spread out radially or annularly. As a result, a Fourier analysis can be used to localize the features of the iris. Therefore, the FMT can be beneficially applied along the radial direction while the regular Fourier transform is applied along the annular direction to localize the energy of the iris image. Exemplary operations for radial and annular analysis are discussed further below.

Prior to describing the details of the transformation algorithm 312, some background is provided on the FMT and the Fourier transform. A one-dimensional FMT in the continuous domain is given in equation (5) below:

$$D(c) = \frac{1}{\sqrt{2\pi}} \int_0^\infty s(t) \frac{e^{-jc\ln t}}{\sqrt{t}} dt \qquad (5)$$

The FMT can be manipulated to result in the following relationship:

$$f(t) = s(e^t)e^{t/2}, \quad D(c) = \frac{1}{\sqrt{2\pi}} \int_{-\infty}^{+\infty} f(t)e^{-jct} dt \qquad (6)$$

In the discrete domain, equation (6) implies the FMT includes of three parts: interpolation, scaling, and Fourier transform. Application of the FMT results in a masked image that is scaled in the radial direction.

The overall modified FMT, including the FMT and the FFT, can be summarized in the continuous domain as follows:

$$f(t_1, t_2) = e^{t_2/2} s(e^{t_2} \cos t_1, e^{t_2} \sin t_1), \qquad (7)$$

$$D(c_1, c_2) = \frac{1}{2\pi} \int_{-\infty}^\infty \int_{-\infty}^\infty f(t_1, t_2) e^{-j(c_1 t_1 + c_2 t_2)} dt_1 dt_2$$

Turning now to the transformation algorithm 312, a converting operation 510 receives an isolated iris image (e.g., from the detecting operation 310, FIG. 3) and converts the isolated iris image into a log-polar domain. In one implementation of the converting operation 510, the iris image is sampled logarithmically in the radial direction and sampled uniformly in the annular direction. Sampling uniformly in the annular direction facilitates a Fast Fourier transform (FFT) discussed below. Sampling logarithmically in the radial direction allows scale invariance along the radial direction.

Logarithmic sampling typically involves interpolating the iris image in the radial direction to obtain radially-positioned samples. In one implementation, the samples are obtained at 256 angles and at 256 radii. The radially-positioned samples are spaced logarithmically from the fitted inner radius to the fitted outer radius (i.e., the inner and outer radii determined in the iris detecting operation 310). As a result, the samples are successively spaced farther and farther apart from the inner radius to the outer radius.

The uniform and logarithmic sampling of the converting operation 510 create a log-polar image of the iris image. In log-polar domain, irises can be efficiently aligned to account for rotations in the angle of the camera that may arise between the issuance process and the verification process. A rotation can be accommodated by shifting one column of the log-polar image across to the opposite side of the log-polar image. Correlating the areas of two log-polar images of the same individual can correct for differences in camera angle.

The converting operation 510 also generates a mask image that indicates non-iris regions in the log-polar image. The mask image contains samples of the log-polar image corresponding to regions of the iris image where no iris information was recovered. The mask image is used later in the FFT operation discussed below.

A scaling operation 512 scales the log-polar image according to the Fourier Mellin transform (FMT). The scaling operation 512 applies an FMT scalar exponential (e.g., $e^{r/2}$ from equation (7)) in the radial direction. The output of the scaling operation 512 is a scaled log-polar image.

A performing operation 514 performs a 2-dimensional (2-D) Fast Fourier transform (FFT) on the scaled log-polar image. The performing operation uses the mask image generated in the converting operation 510 to ensure only iris data is used in the FFT. The 2-D FFT is the application of the second line of equation (7), shown above. The output of the transformation algorithm 312 is a representation of the iris in a standardized domain that concisely represents annular and radial features of the iris. Such a concise representation in the standardized domain facilitates efficient iris comparisons during iris verification.

Figure 8:
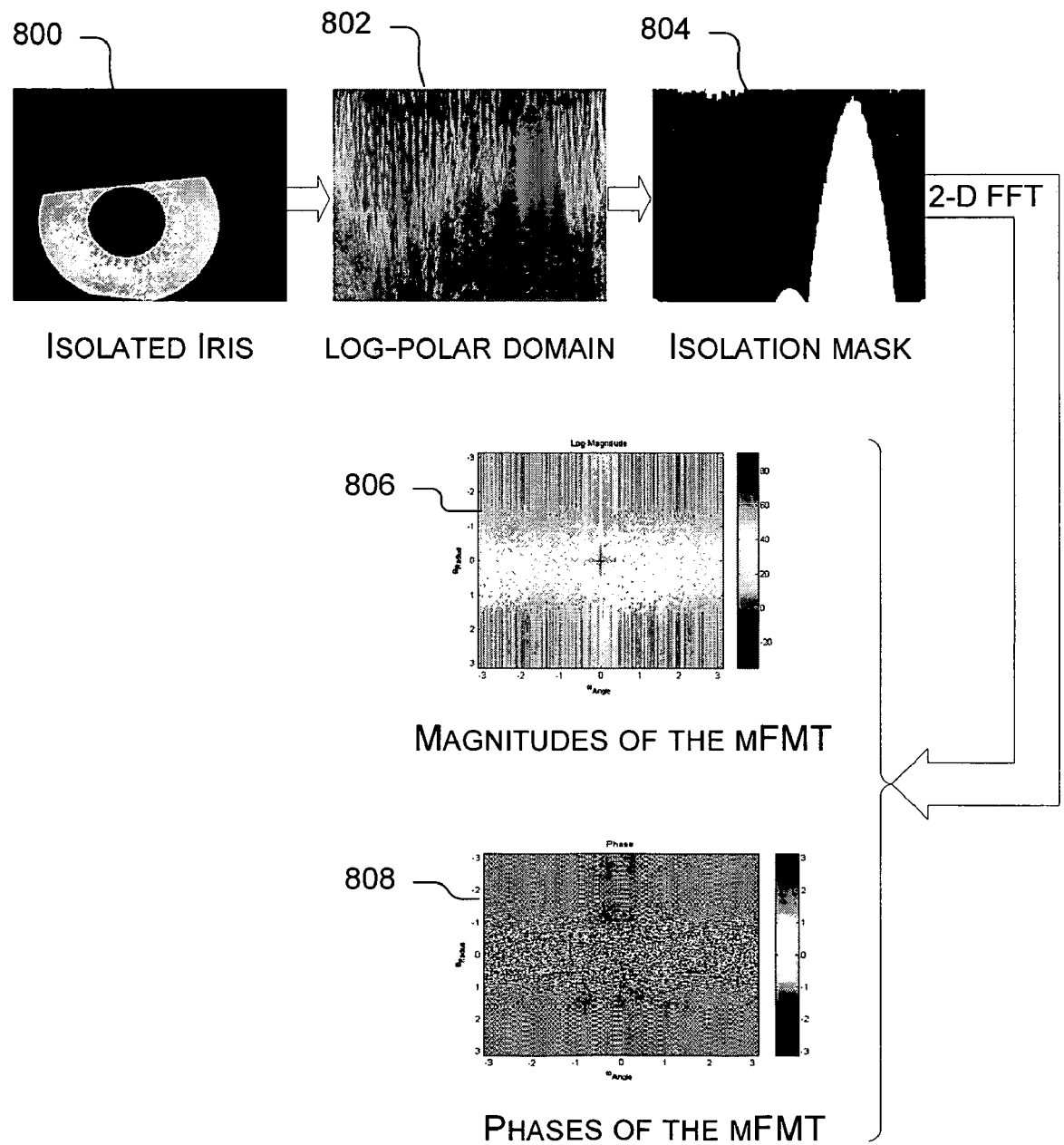
FIG. 8 illustrates an exemplary process of transforming an isolated iris image into a log-polar domain and a modified Fourier-Mellin transform (mFMT) domain in an exemplary iris-based biometric verification process.

A graphical example of transforming a scanned iris image into a standardized form is illustrated in FIG. 8. As shown in FIG. 8, an isolated iris image 800 is first converted into a log-polar image 802. During the conversion to; log-polar domain, an isolation mask image 804 is generated for use during the 2-D FFT. Before the 2-D FFT is applied, the log-polar image 802 is scaled using the FMT scalar exponential of equation (7). The 2-D FFT then transforms the scaled log-polar image using the isolation mask image 804. The 2-D FFT yields a set of FFT coefficients that correspond to magnitude and phase representation of the iris, as illustrated in an mFMT magnitude plot 806 and an mFMT phase plot 808.

The description now returns to the extracting operation 314 of the iris analysis algorithm 300 shown in FIG. 3. The transformed iris image is compressed into a limited storage space so that when ID verification is performed, the probabilities of false negative and positive results are minimized. One way of compressing the transformed iris is to extract representative features from the transformed iris. Intuitively, extracting such features corresponds to compression with minimal distortion.

Accordingly, after the transforming operation 312, an extracting operation 314 extracts selected features and generates a representative feature vector. Feature extraction can be achieved using techniques such as singular vector decomposition, Fisher discriminant kernels, or Principle Component Analysis (PCA) and its variants. However, use of such techniques frequently comes at the expense of a large storage requirement at the verification module. For example, a PCA based system requires storing subspace eigenvectors at the verification module.

To simplify the verification process, an implementation, of the extracting module 314 satisfies a distance objective via the Maximum A Posteriori (MAP) principle. When determining whether two iris digests match, the two possible outcomes are denoted as IS and NOT, for the two cases when iris digests do and do not correspond to the same physical iris, respectively.

To explain the MAP approach, a physical iris of user k is denoted as I(k), the iris's $j^{th}$ scan as I(k, j), and the corresponding extracted features as a vector $\vec{\upsilon}(k,j) \subset \mathbb{R}^n$ of length n elements contained in an iris digest. Assume a reference database is available that includes feature vectors $\gamma = \{\vec{\upsilon}(k, j), k=1 \ldots K, j=1 \ldots J\}$, which are associated with $\mathcal{I} = \{I(k,j), k=1 \ldots K, j=1 \ldots J\}$ iris scans, respectively. A feature vector, $\vec{\upsilon}(0,1) \notin \gamma$, is extracted from mFMT transformed iris scan I(k,j) such that the distance between $\vec{\upsilon}(0,1)$ and the feature vectors $\vec{\upsilon}(k,j) \in \gamma$ is maximized.

In addition, subsequent scans of the same iris should have minimized distance. In one implementation, Euclidean distance is used as a similarity metric. Hence, for two feature vectors $\vec{\upsilon}$ and $\vec{\omega}$, their similarity is quantified as:

$$s(\vec{\upsilon}, \vec{\omega}) = \left[ \sum_{i=1}^{n} (\vec{\upsilon}_i - \vec{\omega}_i)^2 \right]^{1/2}.$$

Having the metric, one or more feature vectors are selected that provide optimal separation.

In order to model the two possible outcomes (i.e., IS and NOT), the two distributions are estimated over s, one for the IS comparisons and one for the NOT comparisons. To achieve a low probability of an incorrect decision, the two distributions must be largely separated with low variances. They can be accurately modeled as non-central $\chi^2$-distributions, however, for simplicity and relative local accuracy, in this work, we perform their Gaussian fitting. Once the distribution of the metric is obtained for both the IS and the NOT case, the decision can be made using the MAP principle:

$$\arg\max_{IS,NOT} \left[ \text{erf}\left(\frac{s - \mu_{IS}}{\sigma_{IS}}\right), \text{erf}\left(\frac{s - \mu_{NOT}}{\sigma_{NOT}}\right) \right] \quad (8)$$

The decision making equivalent to the above expression is equivalent to threshold comparison s<T and s>T. The threshold $\mu_{IS} < T < \mu_{NOT}$ can be selected so as to balance the false positive and negative probabilities. Using the above equations, a metric can be determined that induces the largest separation between the comparison distributions.

Given a reference vector class X, a series of m unrelated vector classes, and an input vector $\bar{x}$ belonging to reference vector class X, a distance metric can be created that characterizes the separation between the comparison distributions. Each vector $x \subset X$ is composed of n independent and identically distributed (IID) Gaussian random variables $x=\{x_1, \ldots, x_n\}$ with each individual variable modeled as $x_i = \mathcal{N}(\mu_{j,i}, \sigma_{j,i})$ where $\mu_i$ and $\sigma_i^2$ are the mean and variance of $x_i$, respectively. The series of m unrelated vector classes is denoted by $Y=\{Y_1, \ldots, Y_m\}$, where each vector $y_j \subset Y_j$ is composed of n IID Gaussian random variables $y_j = \{y_{j,1}, \ldots, y_{j,n}\}$ modeled using the same model $y_{j,i} = \mathcal{N}(\mu_{j,i}, \sigma_{j,i})$. The means and variances in the system have unknown and independent distributions. The input vector, $\bar{x}$, is denoted by $\bar{x}=\{\bar{x}_1, \ldots, \bar{x}_n\} \in \{\mathbb{R}\}^n$, which belongs to the reference vector class X; i.e., $\bar{x}$ is generated using the same statistical model.

Given the foregoing vector data, a subset of vector indices $S \subset \{1 \ldots, n\}$ is determined such that the subset of vector indices maximizes the expected Euclidean distance for vectors of class X, such as $\bar{x}$, with respect to any other vector class in Y, while simultaneously minimizing the expected Euclidean distance among all vectors generated within the same class X. More formally, in order to address the MAP principle in equation (8), the following metric is optimized:

$$\underset{S}{\operatorname{argmax}} \Delta(S, X) = \underset{S}{\operatorname{argmax}} \frac{1}{m} \sum_{j=1}^{m} \sum_{i \subset S} E[(y_{j,i} - \bar{x})^2] - \sum_{i \subset S} E[(x_i - \bar{x}_i)^2], \quad (9)$$

where vector x is an arbitrary vector within the reference class X generated independently from $\bar{x}$.

The feature extracting operation 314 then selects the subset S that optimally maximizes the expected metric $\Delta(S,X)$ for a vector $\bar{x}$ of class X with respect to a set of vector classes Y. The subset S corresponds to all vector variables $\bar{x}_i$, that satisfy the following relation:

$$\frac{1}{m} \sum_{j=1}^{m} [\sigma_{j,i}^2 + (\mu_{j,i} - \mu_i)^2] > \sigma_i^2 \quad (10)$$

It can be shown that the metric $\Delta(S,X)$ improves as long as indices i for which the following relation holds:

$$\frac{1}{m} \sum_{j=1}^{m} E[(y_{j,i} - \bar{x}_i)^2] > E[(x_i - \bar{x}_i)^2] \quad (11)$$

are included in S. Because $E[(y_{j,i} - \bar{x}_i)^2] = E[((y_{j,i} - \mu_{j,i}) - (\bar{x}_i - \mu_i) + (\mu_{j,i} - \mu_i))^2]$ and $E[(x_i - \bar{x}_i)^2] = 2\sigma_i^2$, equation (10) is true.

The extracting operation 314 performs a simple search over the set of magnitude and phase coefficients [mag(x, y), phase(x, y)] to find an optimal subset of these coefficients that generates maximum separation of I with respect to $\mathcal{I}$. This assumes that normalized magnitude and phase mFMT coefficients are IID random variables, for a given input class of iris scans [mag(x, y), phase(x, y)]=mFMT(I(k,j)) for j=1 . . . J associated with user k and a reference database $I(k) \notin \mathcal{I}$.

The extracting operation 314 includes all mFMT coefficients in S that satisfy the feature extraction requirement from equation (10). The metric is computed individually for each coefficient as coefficients of mFMT(I) are compared to the corresponding statistics of mFMT coefficients of other users from $\mathcal{I}$. More relevant statistics for $\{\mu_i, \sigma_i\}$ and $\{\mu_{j,i}, \sigma_{j,i}\}$ may be obtained with more iris scans. For example, in one implementation at least ten scans of each iris class I are required, i.e., J>10. Because feature extraction is performed only during issuance, this requirement does not impose significant user inconvenience.

In a particular implementation, the feature extraction and compression processes are performed simultaneously. The set of actual indices included in the iris digest is governed by the storage requirement. If the set can be compacted such that it fits the storage limitation, then the entire set S is included—both indices and quantized coefficient values. Otherwise, only a subset of indices from S is included with the best feature extraction metric. It is straightforward to show that this approach provides good performance under a certain storage constraint.

Advantageously, for each person, the set of indices that are selected are typically different. Thus, the feature vector emphasizes the distinct features of a given iris scan, features that are not likely to be present in other peoples' irises. In the encoding process, some bits are used for indicating which mFMT coefficients are selected.

Additionally, the bulk of the selected points occur on the DC frequencies of the mFMT. This makes intuitive sense, because the typical features of the iris occur along the shapes indicated by the DC coefficients. Since the points used for each person vary, the optimal threshold for each person also varies. For this reason, the threshold used for the decision must also be encoded.

For a large $\mathcal{I}$, the learning of feature vectors typically have only minor statistical variations for similar iris data-sets outside of $\mathcal{I}$. According to the best practice of random sampling, and as has been verified through bootstrapping methods, the unrelated class of vectors represent the features of the expected final user base.

The compressing operation 316 of the iris analysis algorithm 300 compresses the selected feature vectors into a final iris digest, r. There are three data-sets that are compressed: the values of the data in the feature vector, the location of the selected mFMT coefficients, and the decision threshold T.

In a particular implementation of the compressing operation 316, the three data-sets are compressed using standard data encoding techniques to transform the data-sets into fewer than 2000 bits. The data vector values are compressed using uniform scalar quantizers, using 5 bits per sample for a total of 850 bits. Since the phase is approximately uniform between $-\pi$ and $\pi$, a scalar quantizer gives good performance at low complexity.

In the particular implementation of the compressing operation 316, the coefficient locations are encoded using an off-the-shelf point compression algorithm. This algorithm uses delta-modulation and combinatorial optimization via the traveling salesman problem to encode planar paths; in our application it encoded the 170 locations at, on average, 6 bits per location for a total of 1 KB. Finally, the desired threshold is encoded using a scalar quantizer. In this implementation; 10 bits per threshold are; used based on a quantizer generalized by the Lloyd-Max algorithm. This totals, on average, 1880 bits while maintaining the computers' ability to distinguish among people based on their irises.

Exemplary Variation on Iris-Based Biometric Verification System

Figure 9:
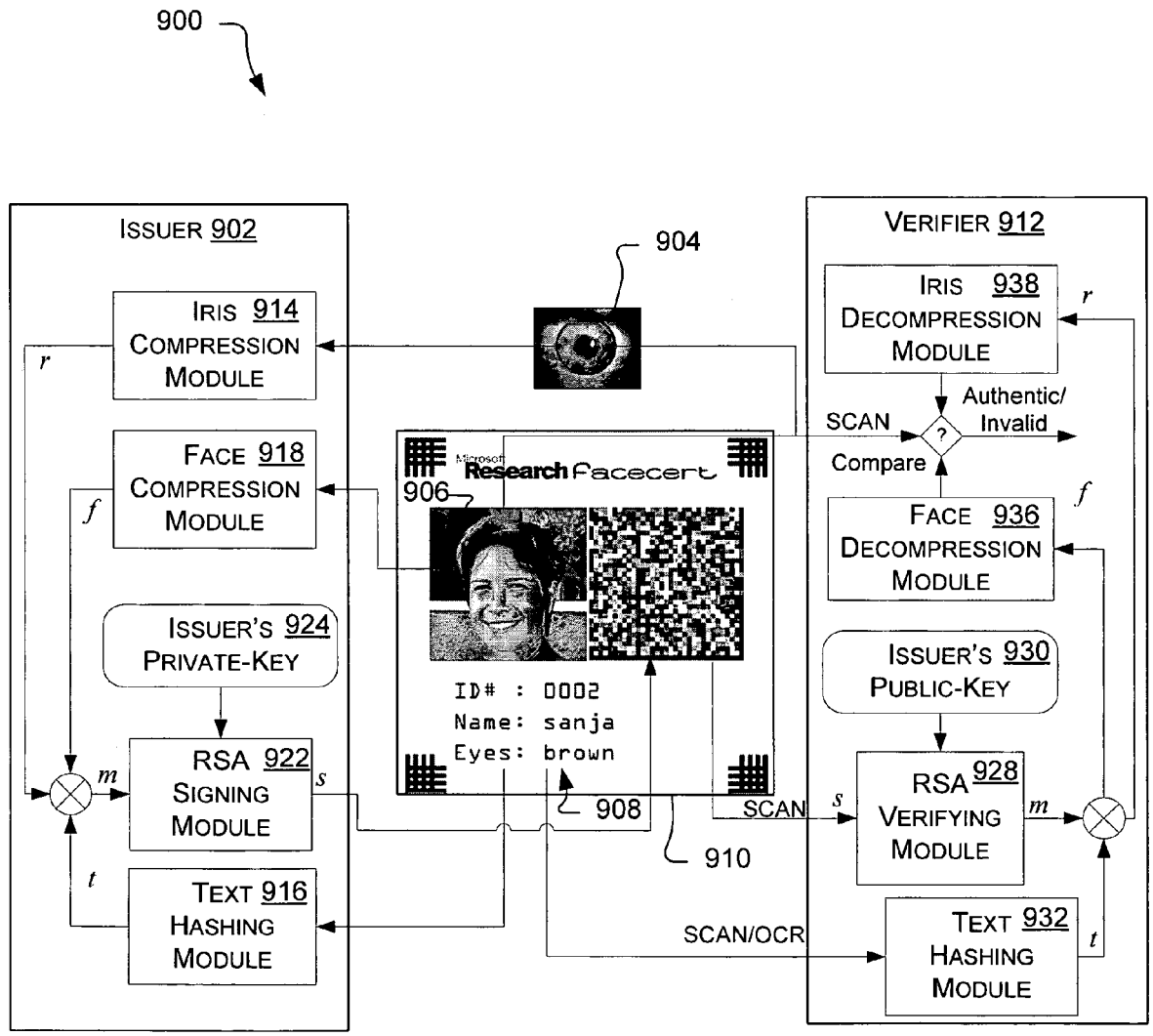
FIG. 9, illustrates an exemplary, biometric verification system that is iris-based and face-based.

FIG. 9 illustrates an implementation of a biometric verification system 900 that verifies users based on facial and iris biometrics. In general, an issuer 902 generates a signed message, s, which represents a user's iris 904, face 906, and supplemental text information 908, which is signed by a PKI certification authority. The issuer 902 issues a security card 910 having the signed message encoded thereon. Subsequently, a verifier 912 can verify the signature and decode the message into an iris digest and a face digest to authenticate the user.

As shown in FIG. 9, the issuer 902 includes an iris compression module 914 and a text hashing module 916, as does the system 100 shown in FIG. 1. The iris compression module 914 and the text hashing module 916 perform processes similar to the processes performed by the iris compression module 118 and text hashing module 124 shown in FIG. 1. Specifically, the iris compression module 914 receives the scanned iris 904 and analyzes the iris by detecting the iris, transforming the iris data into a common domain, extracting features of the transformed iris, and compressing selected features to generate an iris digest, r.

The text hashing module 916 performs a hashing algorithm on text 508 that is descriptive of the individual. Exemplary hashing algorithms are SHA1 and MD5, but any other hashing algorithm can be used. The text hashing algorithm 916 outputs a message digest, t.

In this implementation, the individual's face 906 is scanned into a digital image by a facial scanner (not shown). Using the digital image of the face, a face compression module 918 generates a face digest, f, which compactly represents the face 906 while increasing a distance metric relative to other faces in a reference database. Specifically, the face compression module 918 increases the distance between any two distinct facial structures. In so doing, the face compression module 918 reduces the likelihood of a false negative and false positive during the verification.

A combining module 920 combines the iris digest, the face digest and the message digest to create a combined message, m. The combined message is input into an RSA signing module 922 that signs the combined message with the issuer's private key 924. The signed message, s, is encoded and printed on the security card 910 in the form of a barcode 926.

Later, the individual can be authenticated at the verifier 912. The verifier scans the iris 904, the face 906, the text 908, and the barcode 926. The barcode 926 can be scanned using standard barcode scanning equipment (not shown). The text 908 is scanned using optical character recognition (OCR).

The scanned barcode is input to an RSA verifying module 928. The RSA verifying module 928 verifies that the signed message is authentic with respect to the issuer's public key 930. The output of the RSA verification module 928 is message, m, if the signed message is authentic. If the signed message is not authentic, the output of the RSA verification module 928 will not be the same message, m, as encoded at the issuer 902, and the individual's identity will be determined to be invalid.

The text hashing module 932 performs the same hashing algorithm on the text 908 that the issuer's text hashing module 916 performed on the text 908. The text hashing module 932 outputs a message digest, t.

A separating module 934 separates the face digest, f, and the iris digest, r, from the message, m, using the message digest, t. Unlike the implementation in FIG. 1, the iris digest and the face digest are each decompressed before comparison at comparator(s) 940.

Accordingly, a face decompression module 936 decompresses the face digest using operations that are generally the inverse of operations used by the face compression module 918. An iris decompression module 938 decompresses the iris digest using operations that are generally the inverse of operations used by the iris compression module 914. The output of the face decompression module 936 is an image of the face 906 (assuming the same face as at issuance). The output of the iris decompression module 938 are the feature vectors that were encoded by the issuance module 110 (assuming the same iris as at issuance).

One or more comparators 940 compare the decompressed iris image with the scanned iris and the decompressed face image with the scanned face. Specifically, the comparator(s) 940 compare the facial-feature data decompressed from f to digital facial-feature data of the scanned face and quantifies the level of similarity (e.g., correlation) between the two faces: the de-compressed face and the scanned face. Similarly, the comparator(s) 940 compare the iris-feature data decompressed from r to digital iris-feature data of the scanned iris and quantifies the level of similarity (e.g., correlation) between the two irises: the de-compressed iris and the scanned iris. The output of the comparator(s) 940 is an authentic or invalid signal.

Exemplary Computing Device

Figure 10:
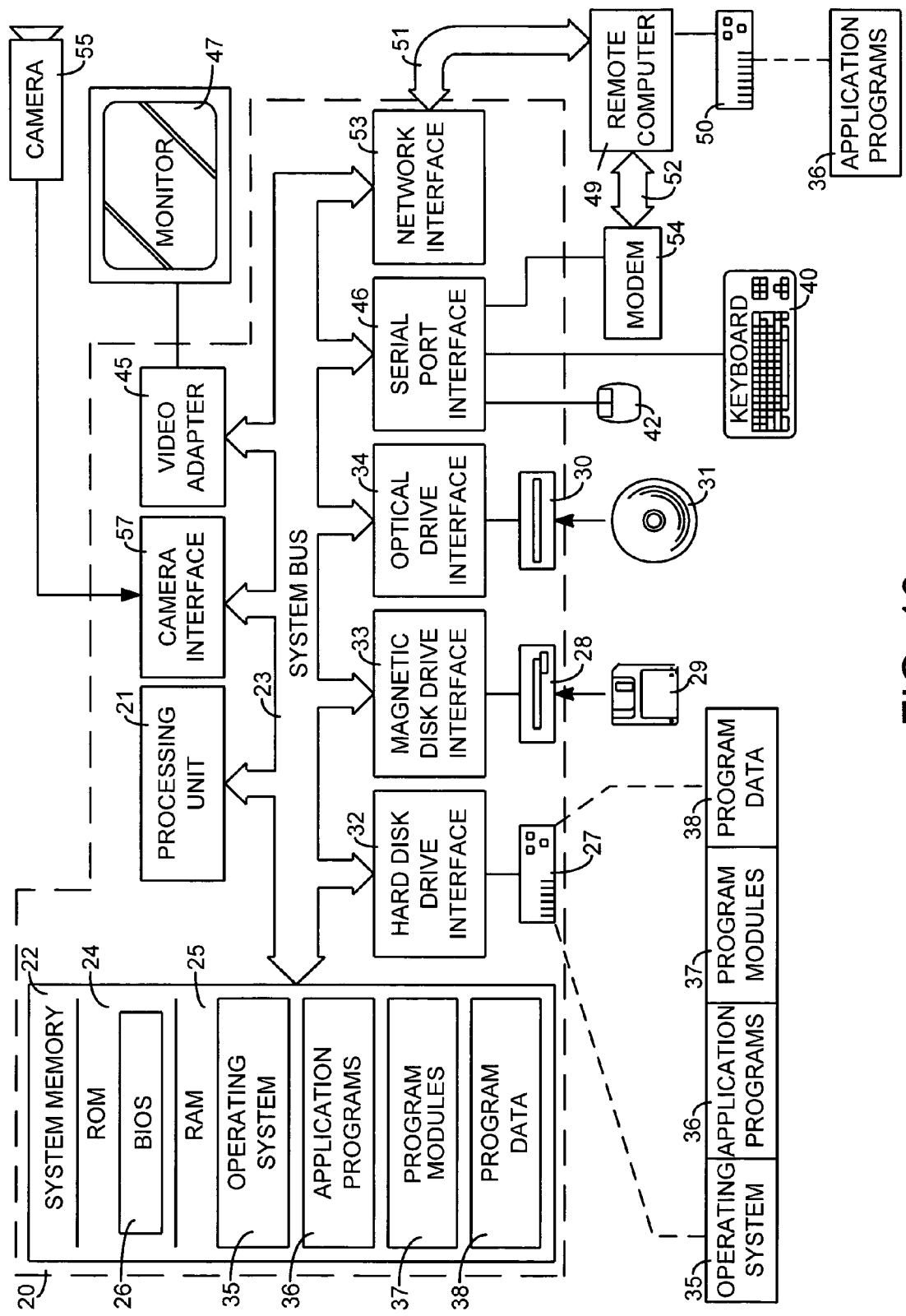
FIG. 10 illustrates a general purpose computer that can be used to implement biometric verification systems and methods described herein.

With reference to FIG. 10, an exemplary system for implementing the operations described herein includes a general-purpose computing device in the form of a conventional personal computer 20, including a processing unit 21, a system memory 22, and a system bus 23. System bus 23 links together various system components including system memory 22 and processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system 26 (BIOS), containing the basic routine that helps to transfer information between elements within the personal computer 20, such as during start-up, is stored in ROM 24.

As depicted, in this example personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM, DVD, or other like optical media. Hard disk drive 27, magnetic disk drive 28, and optical disk drive 30 are connected to the system bus 23 by a hard disk drive interface 32, a magnetic disk drive interface 33, and an optical drive interface 34, respectively. These exemplary drives and their, associated computer-readable media provide nonvolatile storage of computer readable instructions, data structures, computer programs and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs), read only memories (ROMs), and the like, may also be used in the exemplary operating environment.

A number of computer programs may be stored on the hard disk, magnetic disk 29, optical disk 31, ROM 24 or RAM 25, including an operating system 35, one or more application programs 36, other programs 37, and program data 38. A user may enter commands and information into the personal computer 20 through input devices such as a keyboard 40 and pointing device 42 (such as a mouse).

A camera 55 (such as a digital/electronic still or video camera, or film/photographic scanner) capable of capturing image data can also be included as an input device to the personal computer 20. The images data is input into the computer 20 via an appropriate camera interface 57. In this example, interface 57 is connected to the system bus 23, thereby allowing the images to be routed to and stored in the RAM 25, or one of the other data storage devices associated with the computer 20. It is noted, however, that image data can be input into the computer 20 from any of the aforementioned computer-readable media as well, without requiring the use of the camera 55.

Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, a universal serial bus (USB), etc.

A monitor 47 or other type of display device is also connected to the system bus 23 via an interface, such as a video adapter 48. In addition to the monitor, personal computers typically include other peripheral output devices (not shown), such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the personal computer 20.

The logical connections depicted in FIG. 10 include a local area network (LAN 51 and a wide area network (WAN) 52. Such networking environments are commonplace in offices, enterprise-wide computer networks, Intranets and the Internet.

When used in a LAN networking environment, personal computer 20 is connected to local network 51 through a network interface or adapter 53. When used in a WAN networking environment, the personal computer 20 typically includes a modem 54 or other means for establishing communications over the wide area network 52, such as the Internet. Modem 54, which may be internal or external, is connected to system bus 23 via the serial port interface 46.

In a networked environment, computer programs depicted relative to personal computer 20, or portions thereof, may be stored in a remote memory storage device. It will be appreciated that the network connections shown are exemplary and other means of establishing a communications link between the computers may be used.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data, types. Typically, the functionality of the program modules may be combined or distributed as desired in various embodiments.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

Although the exemplary operating embodiment is described in terms of operational flows in a conventional computer, one skilled in the art will realize that the present invention can be embodied in any platform or environment that processes and/or communicates video signals. Examples include both programmable and non-programmable devices such as hardware having a dedicated purpose such as video conferencing, firmware, semiconductor devices, hand-held computers, palm-sized computers, cellular telephones, and the like.

Although some exemplary methods and systems have been illustrated in the accompanying drawings and described in the foregoing Detailed Description, it will be understood that the methods and systems shown and described are not limited to the particular implementation described herein, but rather are capable of numerous rearrangements, modifications and substitutions without departing from the spirit set forth herein.

What is claimed is:

1. A method comprising:
   forming a feature vector associated with an iris of an individual using a transform operation including:
      converting an image of the iris into a log-polar image,
      scaling one or more samples in the log-polar image with a Fourier-Mellin transform scalar exponential,
      performing a Fourier transform on the log-polar image;
   forming an iris digest based on the feature vector; and
   creating a biometric identifier based on the iris digest.

2. A method as recited in claim 1, wherein the biometric identifier is a document.

3. A method as recited in claim 1, wherein the biometric identifier is an identity card.

4. A method as recited in claim 1, wherein the scaling is applied in a radial direction of the iris.

5. A method as recited in claim 1, wherein the converting comprises:
   sampling the iris image logarithmically in a radial direction of the iris; and sampling the iris image uniformly in an annular direction of the iris.

6. A method as recited in claim 1, wherein the scaling is applied in a radial direction of the iris, and wherein the Fourier transform is applied along an annular direction of the iris.

7. A method as recited in claim 1, wherein the transform operation is carried out in a discrete domain.

8. A method as recited in claim 1, wherein the transform operation further comprises:
creating a rectangular representation of the iris; and
masking regions in the rectangular representation that do not include iris data.

9. A method as recited in claim 1, wherein forming the iris digest based on the feature vector includes compressing the feature vector.

10. A method as recited in claim 1 further comprising:
detecting a pupil in the iris image;
detecting an iris annulus around the iris in the iris image; and
removing noise from the iris image, the noise being due to elements in the iris image other than the iris.

11. A method as recited in claim 1 wherein the feature vector is generated using a distance metric that characterizes a numerical difference between the iris and a reference iris.

12. A computer-readable medium having stored thereon computer-executable instructions for causing a computer to perform a process comprising:
forming an isolated iris image from an image of an eye of an, individual;
forming an iris digest based on the isolated iris image using a transform operation including:
converting isolated iris image into a log-polar image,
scaling one or more samples in the log-polar image according to a Fourier-Mellin transform,
performing a Fourier transform on the log-polar image; and
creating a biometric identifier based on the iris digest.

13. A computer-readable medium as recited in claim 12, wherein forming an isolated iris image comprises:
detecting a pupil in the image of the eye;
detecting an iris annulus around an edge of the iris in the image of the eye;
removing noise from the image of the eye around the iris annulus.

14. A computer-readable medium as recited in claim 12, the process further comprising:
hashing text descriptive of the individual; and
combining the hashed text with the iris digest.

15. A computer-readable medium as recited in claim 12, the process further comprising signing the biometric identifier with a private-key.

16. A computer-readable medium as recited in claim 12, the process further comprising encoding the biometric identifier in a barcode.

17. A computer-readable medium as recited in claim 12, the process further comprising:
encoding the biometric identifier in a barcode; and
printing the barcode on a document.

18. A computer-readable medium as recited in claim 12, the process further comprising:
hashing text descriptive of the individual;
combining the hashed text with the iris digest;
including the combined hashed text and the iris digest in the biometric identifier;
signing the biometric identifier with a private-key; and
encoding the biometric identifier in a barcode.

19. A computer-readable medium as recited in claim 12, wherein forming the iris digest further includes creating a feature vector based on the Fourier transform.

20. A computer-readable medium as recited in claim 12, wherein forming the iris digest further includes creating a feature vector by selecting one or more Fourier transform coefficients generated from the Fourier transform.

21. A computer-readable medium as recited in claim 12, wherein the scaling is applied in a radial direction of the iris, and wherein the Fourier transform is applied along an annular direction of the iris.

22. A computer-readable medium as recited in claim 12, wherein the process further comprises forming a face digest from an image of a face of the individual.

23. A computer-readable medium as recited in claim 12, wherein the process further comprises forming a face digest from an image of a face of the individual, and wherein the creating a biometric identifier comprises creating a biometric identifier based on the iris digest and the face digest.

* * * * *